United States Patent
Garfinkel (10) Patent No.: US 11,737,428 B2
(45) Date of Patent: Aug. 29, 2023

(54) RECOVERY PET COLLAR

(71) Applicant: Comfurt Collar LLC, Woodmere, NY (US)

(72) Inventor: Sandi Garfinkel, Woodmere, NY (US)

(73) Assignee: Comfurt Collar LLC, Woodmere, NY (US)

( * ) Notice: Subject to any disclaimer, the term of this patent is extended or adjusted under 35 U.S.C. 154(b) by 534 days.

(21) Appl. No.: 15/152,314

(22) Filed: May 11, 2016

(65) Prior Publication Data
US 2017/0099808 A1    Apr. 13, 2017

Related U.S. Application Data

(60) Provisional application No. 62/238,436, filed on Oct. 7, 2015.

(51) Int. Cl.
*A01K 13/00* (2006.01)

(52) U.S. Cl.
CPC .................. *A01K 13/006* (2013.01)

(58) Field of Classification Search
CPC .. A01K 13/006; A01K 27/001; A01K 27/003; A01K 27/005
USPC ......................... 119/712, 814, 815
See application file for complete search history.

(56) References Cited

U.S. PATENT DOCUMENTS

| | | | | |
|---|---|---|---|---|
| 3,189,917 A | * | 6/1965 | Sims | A42B 3/0473 128/DIG. 23 |
| 3,497,872 A | * | 3/1970 | Mitchell | A41D 13/0512 2/468 |
| 4,413,588 A | * | 11/1983 | Lindholm | A01K 15/04 119/760 |
| 4,476,814 A | * | 10/1984 | Miller | A01K 27/005 119/815 |
| 5,263,202 A | * | 11/1993 | Siberell | A41F 1/00 2/158 |
| 5,946,724 A | * | 9/1999 | Erickson | A41D 3/00 2/108 |
| 6,058,517 A | * | 5/2000 | Hartunian | A41D 13/0512 2/468 |
| 6,327,751 B1 | * | 12/2001 | Ikeda | F16G 11/101 24/115 G |
| 6,659,046 B2 | * | 12/2003 | Schmid | A01K 13/006 119/815 |

(Continued)

FOREIGN PATENT DOCUMENTS

| KR | 20200001755 U | * | 8/2020 |
|---|---|---|---|
| KR | 20210000986 U | * | 5/2021 |

OTHER PUBLICATIONS

Zen Collar "The Original ProCollar", (n.d.). http://zenpetusa.com/products/recovery/zen-collar-the-original-procollar/.

*Primary Examiner* — Magdalena Topolski
(74) *Attorney, Agent, or Firm* — Sheppard, Mullin, Richter & Hampton LLP (57) ABSTRACT

A neck collar includes a body, a tensioning cord, and a pair of mating fastener straps. The body defines an opening configured to wrap around the neck of an animal and includes a pair of distal ends forming a gap therebetween. The tensioning cord is at least partially disposed through the body and configured to adjust the size of the opening. Each fastener strap is disposed on an outer surface of the body proximate a respective distal end and at least one fastener strap extends across the gap.

9 Claims, 6 Drawing Sheets

(56) References Cited

U.S. PATENT DOCUMENTS

| | | | | |
|---|---|---|---|---|
| 7,441,516 | B2 * | 10/2008 | Sharpe | A01K 13/006 119/792 |
| D632,851 | S * | 2/2011 | Maroney | D30/145 |
| D643,160 | S * | 8/2011 | Welles | D30/145 |
| 8,042,494 | B2 * | 10/2011 | Markfield | A61D 9/00 119/815 |
| 8,881,687 | B2 * | 11/2014 | Colangelo | A01K 13/007 119/815 |
| 9,204,621 | B1 * | 12/2015 | Miller | A01K 27/002 |
| 10,226,030 | B2 * | 3/2019 | Durrant | A01K 27/001 |
| 2007/0181080 | A1 * | 8/2007 | Gibson | A01K 13/006 119/815 |
| 2009/0107419 | A1 * | 4/2009 | Davis | A01K 13/006 119/815 |
| 2010/0024741 | A1 * | 2/2010 | Schoppman | A01K 27/005 119/795 |
| 2011/0174237 | A1 * | 7/2011 | Sanders-Luckman | A01K 13/006 119/792 |
| 2011/0271913 | A1 * | 11/2011 | Min | A01K 27/002 119/856 |
| 2012/0145093 | A1 * | 6/2012 | Martinez | A01K 13/006 119/863 |
| 2015/0164045 | A1 * | 6/2015 | Colangelo | A01K 13/006 119/855 |

* cited by examiner

RECOVERY PET COLLAR

CROSS-REFERENCE TO RELATED APPLICATION

The present application claims the benefit of and priority to U.S. Provisional Patent Application No. 62/238,436, filed on Oct. 7, 2015, the entire contents of which are incorporated by reference herein.

FIELD OF INVENTION

The present invention generally relates to an Elizabethan collar to be worn around an animal's neck to prevent the animal from biting, licking, and/or nuzzling other portions of its body, such as a cut, wound, injury or the like.

BACKGROUND

Conventional Elizabethan and collars are applied to the necks of animals in order to inhibit access by the animal to sensitive portions of its body with its mouth, for example, to prevent licking, biting, and/or nuzzling.

For example, flared or cone-shaped collar devices have been applied to the necks of animals to provide a barrier between the animal's mouth and other portions of the animal's body. As another example, stiff collars, which may be straight or flared, have been applied to animal's necks to inhibit the range of motion of the animal's head. In still another example, wide Elizabethan-type collar devices have been applied as a drape around animal's necks. However, such conventional collar device configurations have disadvantages. For example, such collars are typically uncomfortable for the animal to wear, partially obstruct the animal's field of view, prevent the animal from accessing necessary items such as food and water dishes, and often prevent the animal from comfortably resting its head on the floor or other surface. As a result, conventional collars often cause mood changes in the animal, causing irritability or depression. They also disrupt the animals ability to eat and sleep.

Another problem with certain conventional collars is that their closures are not particularly strong or secure, and in many instances, the animal is able to break free from the collar. For example, the "Neck Hugs" soft collars sold by Wag Tail Farms of Richmond, Va. uses Velcro® hook-and-loop fasteners (sold by Velcro Industries B.V. of Manchester, N.H.) to secure a neck pillow around a dog's neck. However, the fasteners are located in positions such that they can be readily separated, and therefore, pose a significant risk that the animal will be able to dislodge the collar.

Accordingly, there is a need to provide a collar for animals that effectively prevents an animal from biting, licking, and/or nuzzling other portions of its body, and at the same time is more comfortable than conventional collars and remains securely attached to the animal's neck during use.

SUMMARY

It is an object of the present invention to provide a collar device that effectively prevents an animal from biting, licking, and/or nuzzling other portions of its body while minimizing impact by the collar device on the animal's quality of life. It is further an object of the present invention to provide a collar device that can be closely fitted to the animal's neck and secured in a manner such that the collar device is not easily dislodged during typical use.

In an exemplary embodiment of the present invention, a neck collar comprises: a body that defines an opening configured to wrap around the neck of an animal, the body comprising a pair of distal ends forming a gap therebetween; a tensioning cord at least partially disposed through the body and configured to adjust the size of the opening; and a pair of mating fastener straps, each fastener strap disposed on an outer surface of the body proximate a respective distal end, wherein at least one fastener strap extends across the gap.

In embodiments, the neck collar further comprises at least one belt loop disposed along an interior surface of the body configured to receive a portion of a pet collar.

In embodiments, the neck collar further comprises a leash attachment configured to be coupled to a portion of the body and to engage a leash.

In embodiments, the leash attachment comprises a strap and at least one ring.

In embodiments, the body comprises a pillow and an outer casing.

In embodiments, at least one end of the tensioning cord comprises a toggle configured to maintain a length of the tensioning cord externally of the body.

In embodiments, the body has an annular configuration.

In an exemplary embodiment of the present invention, a neck collar comprises: a body that defines an opening configured to wrap around the neck of an animal, the body comprising a pair of distal ends forming a gap therebetween; a first pair of mating fastener straps, each fastener strap disposed on an outer surface of the body proximate a respective distal end and wherein at least one fastener strap extends across the gap; and a second pair of mating fasteners, each fastener disposed on respective opposed faces of the distal ends of the body.

In embodiments, the neck collar further comprises at least one belt loop disposed along an interior surface of the body configured to receive a portion of a pet collar.

In embodiments, the neck collar further comprises a leash attachment configured to be coupled to a portion of the body and to engage a leash.

In embodiments, the leash attachment comprises a strap and at least one ring.

In embodiments, the body comprises a pillow and an outer casing.

In embodiments, the body has an annular configuration.

In an exemplary embodiment of the present invention, a neck collar comprises: a body that defines an opening configured to receive the neck of an animal, the body has a pair of distal ends forming a gap therebetween; a tensioning cord at least partially disposed through the body and configured to adjust the size of the opening; and a first pair of mating fastener straps, each fastener strap disposed on an outer surface of the body proximate a respective distal end and wherein at least one fastener strap extends across the gap; and a second pair of mating fasteners, each fastener disposed on respective opposed faces of the distal ends of the body.

In embodiments, the neck collar further comprises at least one belt loop disposed along an interior surface of the body configured to receive a portion of a pet collar.

In embodiments, the neck collar further comprises a leash attachment configured to be coupled to a portion of the body and to engage a leash.

In embodiments, the leash attachment comprises a strap and at least one ring.

In embodiments, the body comprises a pillow and an outer casing.

In embodiments, at least one end of the tensioning cord comprises a toggle configured to maintain a length of the tensioning cord externally of the body.

In embodiments, the body has an annular configuration.

BRIEF DESCRIPTION OF THE DRAWINGS

Various exemplary embodiments of this invention will be described in detail, with reference to the following figures, wherein.

DETAILED DESCRIPTION

The present invention generally relates to a collar device for use on the neck of an animal. In embodiments, the present invention relates to an Elizabethan (or similar) neck collar for use on an animal's neck to prevent the animal from biting, licking, and/or nuzzling other portions of its body.

Figure 1:
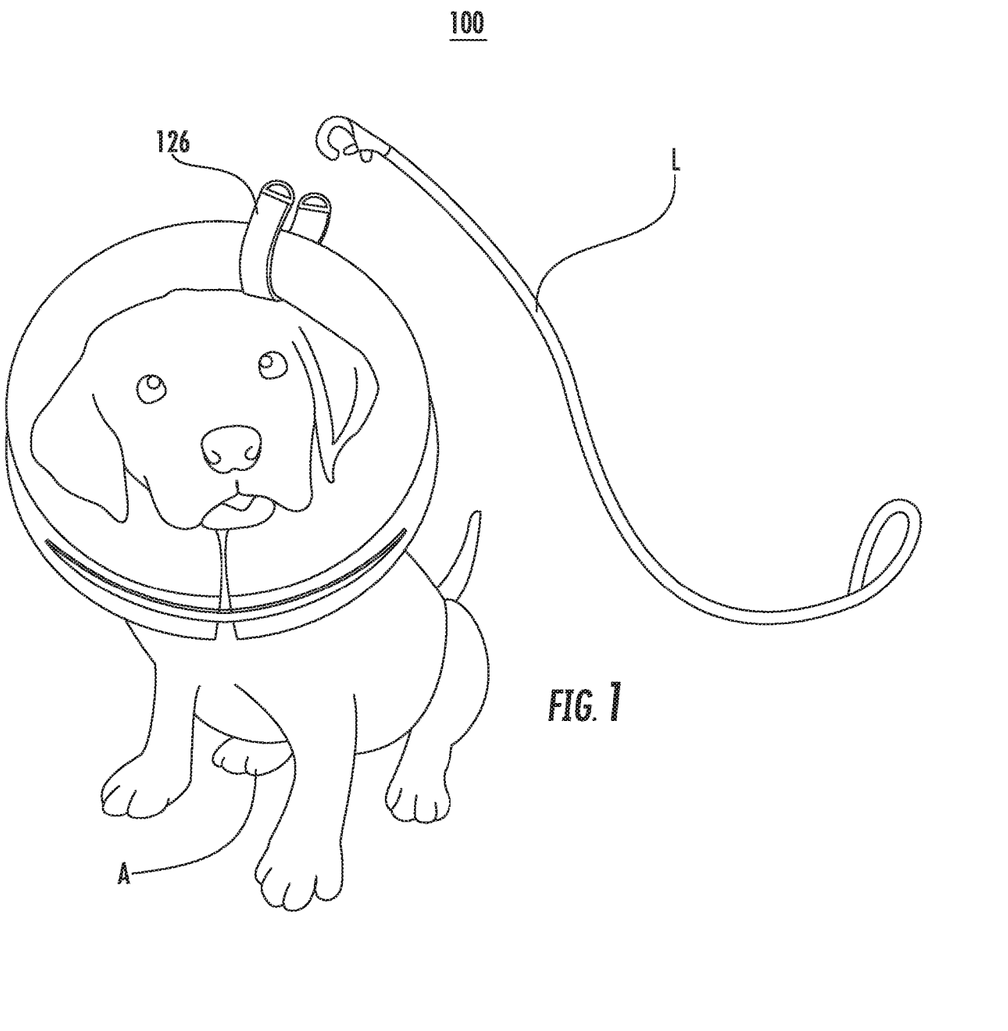
FIG. 1 is a perspective view of a neck collar worn around the neck of a dog according to an exemplary embodiment of the present invention.

Referring to FIG. 1, an exemplary embodiment of a neck collar 100 is shown disposed around the neck of an animal A. Although animal A is depicted as a dog, it should be understood however neck collar 100 may be configured to be worn by different animals, including, for example, cats, horses, sheep, cattle, or even humans, to name a few. Neck collar 100 is configured to be worn around the neck of animal A. As shown, neck collar 100 has a sufficient size and thickness that restricts the range of motion of the animal's head and prevents the animal from biting, licking, or nuzzling other portions of its body that are injured, infected, cut, or wounded, or where the animal is bandaged or stitched from a surgical or medical procedure. As a result, the neck collar 100 prevents the animal A from reaching injured or infected area, effectively allowing such site on the body to properly heal.

On the other hand, the neck collar 100 has a soft, comfortable, and minimally obtrusive design so as to provide greater comfort to the animal A than prior neck collars.

Figure 2:
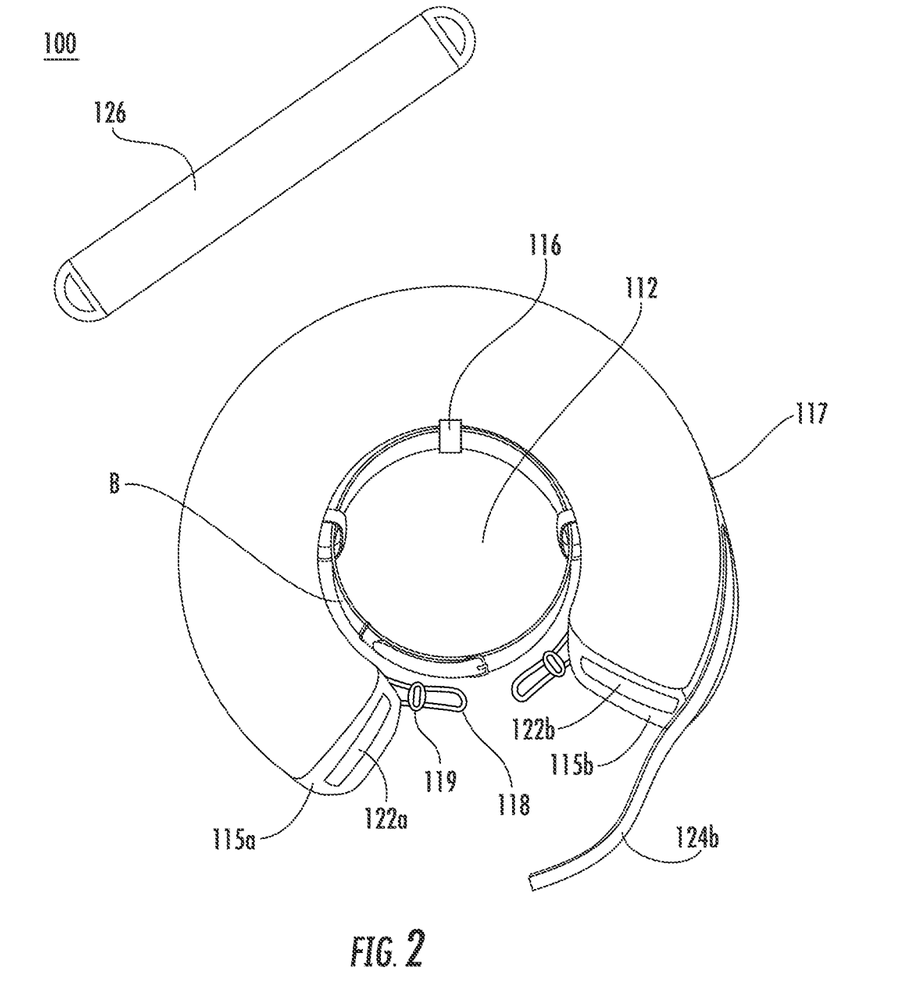
FIG. 2 is another perspective view of the neck collar of FIG. 1 having a pet collar secured to its inner surface and an optional leash attachment.
Figure 3:
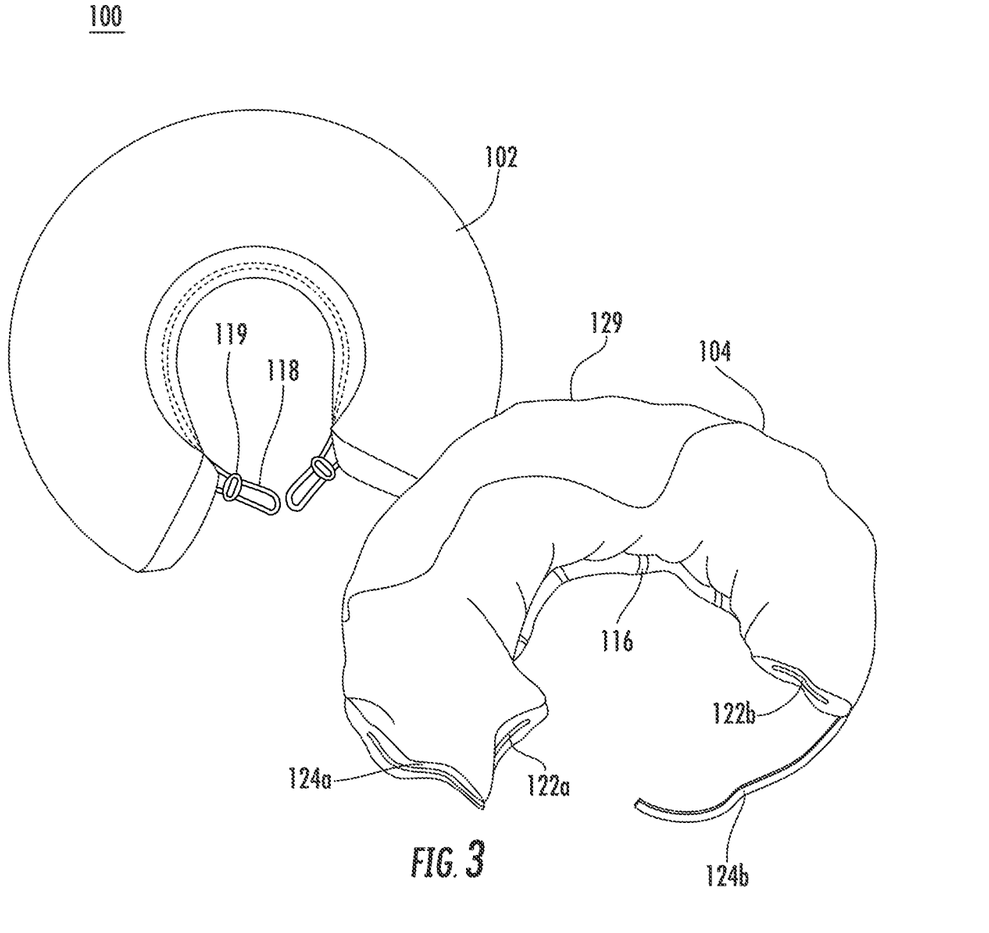
FIG. 3 shows the neck collar of FIG. 1 with the outer casing removed.

Turning to FIGS. 2 and 3, the neck collar 100 includes an outer casing 104, and a pillow 102 that is enclosed within the casing. It should be noted, however, that the present invention can be implemented without an outer casing 104. In such case, the pillow 102 would include the various components that are described herein as being disposed on the outer casing 104.

In FIG. 2, the pillow 102 (not shown) is housed within the outer casing 104 to form the neck collar 100. The casing 104 can optionally include a closure, such as zipper 129, that allows the pillow 102 to be removed from the casing 104. The inner surface 113 of the inner perimeter of the neck collar 100 forms a neck opening 112 so that the collar 100 can be worn around the animal's neck. The inner surface 113 includes belt loops 116, which are used to secure a pet collar B worn by the animal A to the neck pillow 100. Although the belt loops 116 are shown as being secured to the inner surface 113 of the outer casing 104, it should be understood that the belt loops 116 could be secured directly to the inner surface of the pillow 102 where an outer casing is not used.

In addition, as shown in FIG. 2, the outer surface 117 on the outer perimeter of the neck collar 100 accommodates mating fastener straps 124a and 124b, e.g., hook-and-loop fasteners, for securing the neck collar 100 to an animal, as further described herein. In addition, a tensioning cord 118 is provided inside of the pillow 102, wherein the tensioning cord 118 wraps around the interior side of the inner surface 113. A toggle 119 is provided at each distal end of the tensioning cord 118. As described below, tensioning cord 118 can be used to adjust the size, fit, and securement of the neck opening 112. In addition, the neck collar 100 includes a first distal end 115a and a second distal end 115b. A first fastener 122a having, for example, hooks disposed on a substrate, is disposed on the first distal end 115a, and a second fastener 122b having, for example, loops disposed on a substrate, is disposed on the second distal end 115b. As discussed below, when the neck collar 100 is worn by the animal A, the distal ends 115a and 115b are placed face to face and the mating fasteners 122a and 122b secure the distal ends 115a, 115b together. An optional leash attachment 126, which wraps around neck collar 100 (see FIGS. 1 and 2), may also be provided for attaching the animal's leash to the neck collar.

As will be further described, the combination of the tensioning cord 118/toggle 119, fasteners 122a and 122b, and/or the fastener straps 124a and 124b allow the neck collar 100 to be custom fit to the animal, and at the same time provide a level of securement sufficient to maintain the collar on the animal. This represents an improvement over other similar neck collars known in the art.

In a preferred embodiment, neck collar 100 preferably has an annular shape, e.g., a donut-like shape. In other embodiments, however, the neck collar 100 may have a different shape, such as, for example, a square, rectangular, triangular, or ovoid in cross-section. Neck collar 100 is formed of a flexible and resilient material such that it can be compressed (e.g., due to forces from the head of the animal), and then resume its shape when the force is removed. In a preferred embodiment, the pillow 102 is made of soft or cushion-like material, as described further herein, and the casing 104 is made a plush fabric that provides a soft texture. These materials make the neck collar 100 comfortable for the animal to wear (e.g., when resting its head thereupon), yet restricts the animal from licking, biting, or nuzzling areas that are infected, injured, cut, wounded, stitched, bandaged, etc.

The neck collar 100 should have a size and thickness that is sufficient to obstruct full turning or tilting of the head of an animal when placed around the neck of the animal. At the same time, the size and thickness should be chosen such that the neck collar 100 does not extend into the peripheral field of vision of the animal or unduly restrict movement of critical activities, such as comfortably resting of the animal's head on a surface, eating food and drinking water from a bowl. Dimensions of neck collar 100 for various sizes are illustrated in Table 1 below according to exemplary embodiments of the present invention. The dimensions illustrated relate to the diameter of opening 112 and the thickness of neck collar 100, e.g., the transverse width of the body of neck collar 100 measured between the inner surface 113 and the outer surface 117 of neck collar 100.

| SIZE | DIAMETER OF OPENING 112 (INCHES) | THICKNESS OF NECK COLLAR 100 (INCHES) |
|---|---|---|
| Extra Small (XS) | 3.75 | 2 |
| Small (S) | 4 | 2.5 |
| Medium (M) | 5.5 | 3 |
| Large (L) | 7 | 3.5 |
| Extra Large (XL) | 7.5 | 4 |
| Extra Extra Large (XXL) | 10 | 5 |

As described above, the neck collar is formed of a resilient, flexible material. In embodiments, the pillow 102 may contain memory foam, gel, fiber, or natural or synthetic fibers and the outer casing 104 is made of felt, velvet, denim, microfiber, cotton, lycra or spandex, or wool, to name a few. These materials are sufficiently flexible to allow the first and second distal ends 115a and 115b to be pulled apart when wrapping the neck collar 100 around the animal's neck (see FIG. 4A), yet at the same time is sufficiently resilient such that the distal ends 115a, 115b will resume their original position (see FIGS. 4B and 4C) such that the neck collar 100 wraps around the animal's neck in a closed position.

Still referring to FIG. 2, one or more belt loops 116 may be defined along the inner surface 113 of outer casing 104. The belt loops 116 may be one or more portions of material attached to the body of neck collar 100 to accommodate a pet collar B, e.g., a standard, belt-like collar device often worn around the necks of many animals therethrough. The belt loops 116 may be, for example, stitched, adhered, or sealed to the body of neck collar 100. In this regard, belt loops 116 may be formed of a fabric attached to the body of neck collar 100 such that belt loops 116 allow for a secondary collar to be secured thereto. Further, such fabric of belt loops 116 may be formed of a material that is more sturdy, e.g., nylon straps, than seen in conventional collar devices. In embodiments, belt loops 116 may be formed by making slits or perforations in the body of neck collar 100 through which a secondary collar device may be passed. In this regard, neck collar 100 is configured to secure to a secondary collar device such that the attachment of the secondary collar device to an animal, e.g., a buckle on a standard collar, is utilized by neck collar 100. In embodiments, and as described further herein, neck collar 100 is configured to additionally or alternatively be secured directly to an animal without the use of a separate pet collar.

As shown, at least one tensioning cord 118 is provided with the body of neck collar 100. Tensioning cord 118 extends through an interior portion of the body of neck collar 100. Tensioning cord 118 is configured to exert one or more compressive forces on the body of neck collar 100. In this regard, tensioning cord 118 is configured to transmit tensile forces therealong, such as in a cord, rope, or string, e.g., a drawstring. In embodiments, tensioning cord 118 may be made of dynamic material (e.g., stretchable material) or static material (e.g., non-stretchable material).

As shown, a pair of ends of tensioning cord 118 may be exposed exteriorly of the body of neck collar 100 such that a length of tensioning cord 118 may be adjustable. The ends of tensioning cord 118 may incorporate a toggle 119, e.g., a spring-actuated toggle or other member configured to maintain a length of tensioning cord 118 disposed exteriorly of the body of neck collar 100. In this regard, tensioning cord 118 may be withdrawn at one or both ends from an interior portion of the body of neck collar 100 in order to cinch a portion of the body. In embodiments, tensioning cord 118 may be disposed along an interior portion of the body of neck collar 100 surrounding opening 112 such that drawing tensioning cord 118 at one or both ends causes the size of opening 112 to be made smaller. Tension on tensioning cord 118 is released by loosening and moving the toggle 119 about the tensioning cord 118, thereby causing the opening 112 to dilate. In this regard, opening 112 may be reconfigurable through tensioning cord 118 to provide opening 112 that is customizable to the neck size of an animal, providing for a better fit than conventional collar devices.

To this end, opening 112 can be cinched via tensioning cord 118 to adjust the size of the opening 112 so that it fits snugly around the neck of an animal, while at the same time prevents unwanted movement or shifting of the neck collar 100.

With continued reference to FIG. 2, a pair of fasteners 122a, 122b are disposed on the opposed ends 115a, 115b of the body of neck collar 100. Fasteners 122a, 122b are a pair of complementary members configured to interengage one another, such as complementary portions of a hook-and-loop fastener. In embodiments, fasteners 122a, 122b may have a different configuration, for example, a button and slit, a zipper and zipper track, female and male snaps, adhesive sections, a buckle configuration, or strings that may be tied, to name a few. In this regard, the opposed ends 115a, 115b of the body of neck collar 100 can be joined to one another via fasteners 122a, 122b so that the gap therebetween can be reduced or closed. Thus, the fasteners 122a, 122b act to further secure the neck collar 100 to an animal, in addition to loops 116 and/or tensioning cord 118.

As shown, another pair of fasteners in the form of fastener straps 124a, 124b (FIG. 3) are disposed on an outer portion of the body of neck collar 100. Like fasteners 122a, 122b, fastener straps 124a, 124b are a pair of complementary members configured to interengage one another, such as complementary portions of a hook-and-loop fastener. As shown, a portion of fastener strap 124a contains hooks and is disposed on an outward-facing surface of the body of neck collar 100 near the gap between distal ends 115a, 115b. The other fastener strap 124b contains loops and is partially secured to an outer portion of the body of neck collar 100 on the opposite side of the gap between ends 115a, 115b as the other fastener strap 124a, and may have a portion extending freely from the body of neck collar 100. The portion of fastener strap 124b extending freely from the body of neck collar 100 has a sufficient length to extend across the gap between ends 115a, 115b and engage fastener strap 124a. Accordingly, the fastener straps 124a, 124b function to further secure the neck collar 100 to an animal, in addition to the loops 116, tensioning cord 118, and/or fasteners 122a, 122b. In this regard, fastener straps 124a, 124b prevent the ends 115a, 115b from being pulled apart, for example, by twisting or shaking by an animal wearing neck collar 100, which may occur in conventional collar devices that lack a fastener that extends circumferentially across a front face of the gap between ends 115a, 115b. In fact, if the hook and loop fastener straps 124a and 124b are pulled in opposite directions parallel to one another), a shear force will be applied to the engaged fastener straps 124a, 124b, thereby providing an even stronger connection. Thus, attempts by the animal A to break free from the collar 100 can actually strengthen the bond between the hooks and the loops. In embodiments, fastener straps 124a, 124b may have a different configuration as described above with respect to fasteners 122a, 122b, for example, a button and slit, a zipper and zipper track, female and male snaps, adhesive sections, a buckle configuration, or strings that may be tied, to name a few. In embodiments, the hooks can be alternatively provided on fastener strap 124b with loops provided on fastener strap 124a.

As shown, neck collar 100 may include or be provided with an leash attachment 126 that provides a surface for engagement by, for example, a leash L. Accordingly, and referring additionally to FIG. 1, leash attachment 126 is provided with one or more looped portions through which a portion of a leash L, e.g., a latching hook, may be attached. In the exemplary embodiment shown, leach attachment 126 may be configured as a strap with a pair of rings at the ends thereof. Thus, attachment member 126 is coupled, e.g., wrapped around, a portion of the body of neck collar 100 with one or both of the rings available for attachment to leash L. In other embodiments, leash attachment 126 may have a different configuration, for example, leash attachment 126 or a portion thereof may be disposed directly on the body of neck collar 100. The leash attachment 126 presents a convenient point for coupling a leash L or other tether such that attachment over the neck collar 100 directly to a secondary pet collar is unnecessary, which is required in conventional collars and may interfere with the proper placement and operation of a collar device.

Still referring to FIG. 2, and referring additionally to FIG. 3, neck collar 100 includes pillow 102 disposed within outer casing 104. The outer casing 104 may include the belt loops 116, fasteners 122a, 122b, and fastener straps 124a, 124b, as well as an aperture to allow for the external passage of the ends of tensioning cord 118 and toggles 119 (not shown), while pillow 102 may include the tensioning cord 118 and the substantial bulk of the body of neck collar 100. In embodiments, tensioning cord 118 may be disposed along an interior portion of outer casing 104 such that the body of neck collar 100 can be cinched by drawing the tensioning cord 118 to cause compression of the outer casing 104 around the pillow 102.

Pillow 102 may include a polymeric filler material, e.g. cushion material, disposed in an outer casing, for example, a fluid-resistant casing. In embodiments, pillow 102 may include a filling material such as memory foam, fiber, gel, or natural or synthetic fiber, to name a few. Outer casing 104 may be material selected for desired characteristics for engagement with a portion of an animal, for example, softness or durability. In embodiments, cover 104 may be formed of, for example, felt, velvet, denim, microfiber, lycra or spandex, or wool, to name a few.

As shown, outer casing 104 defines an interior recess may include one or more openings for receiving pillow 102 therein. As described above, outer casing 104 includes a zipper 129 such that outer casing 104 can be enclosed around pillow 102. Outer casing 104 may thus be removable from pillow 102 such that outer casing 104 can be, for example, replaced or washed. Thus, as compared to conventional collar devices, either outer casing 104 or pillow 102 may be reusable with a different respective cushioning member or covering. Outer casing 104 may also incorporate one or more surface patterns, for example, for decorative purposes. In embodiments, outer casing 104 may incorporate one or more functional indicia, for example, indicating a proper direction for orientation on an animal.

Figure 4A:
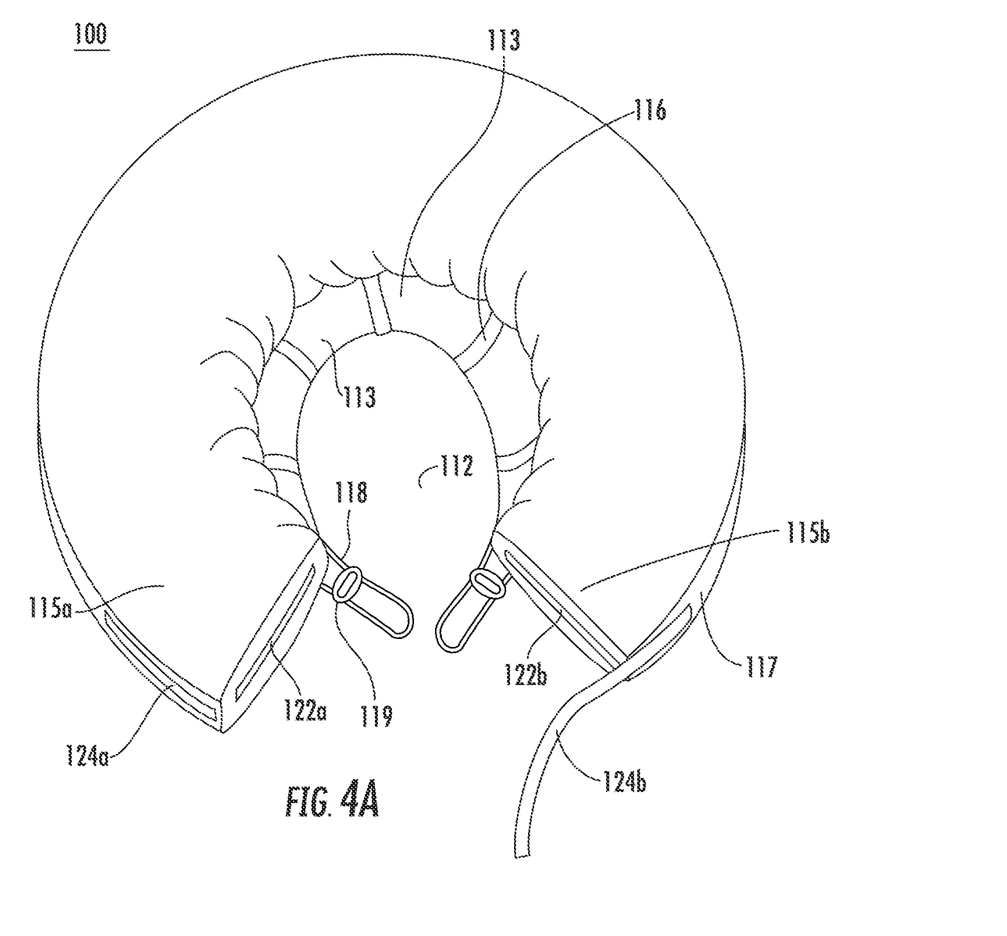
FIG. 4A shows the neck collar of FIG. 1 in an open state, prior to being applied to an animal.
Figure 4B:
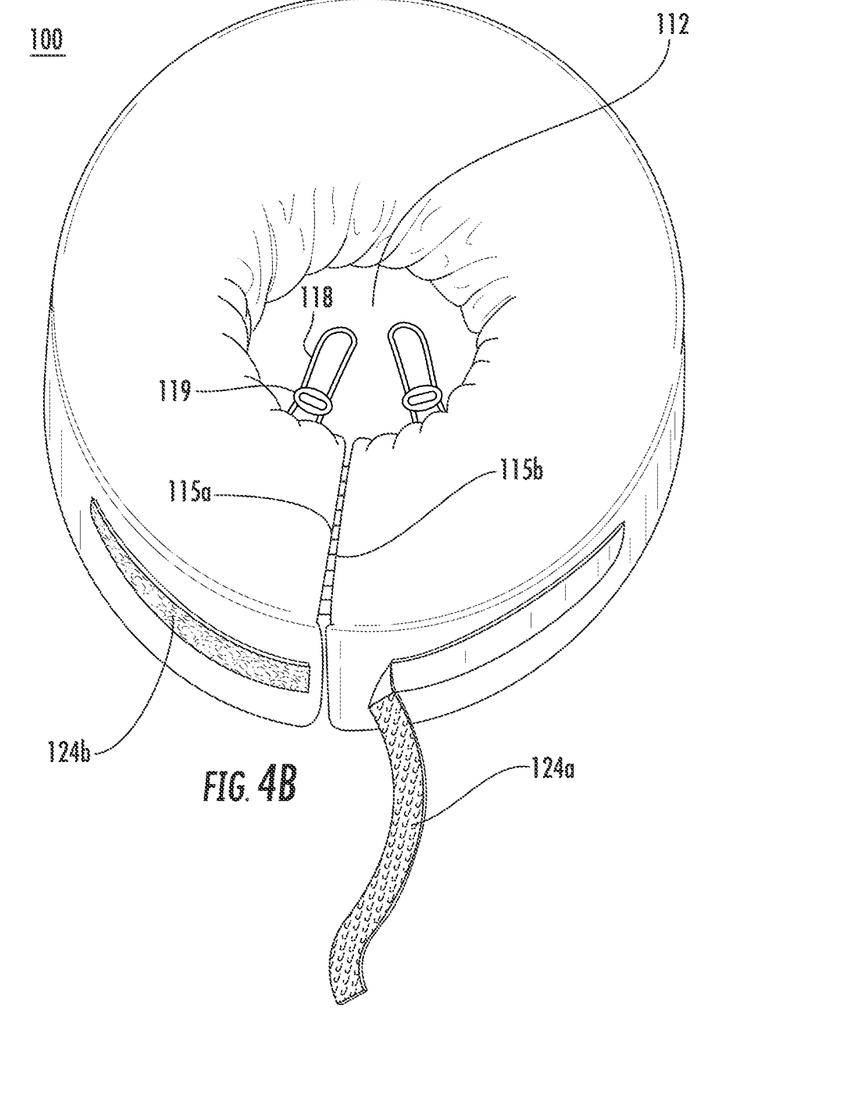
FIG. 4B shows the neck collar of FIG. 1 in a closed state.
Figure 4C:
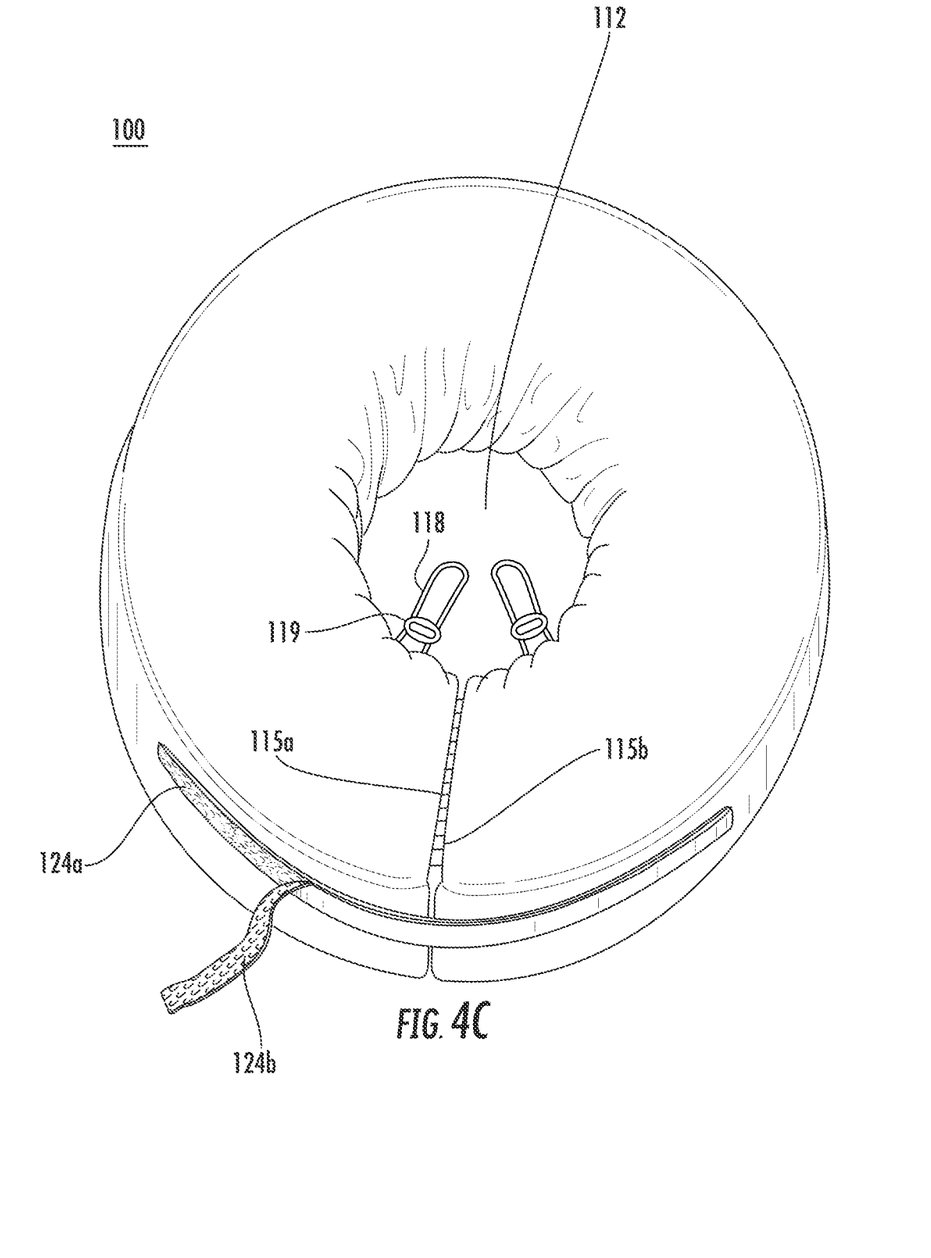
FIG. 4C shows a perspective view of the neck collar show in FIG. 4B.

Turning now to FIGS. 4A-4C operation of the neck collar 100 will be described according to an exemplary embodiment of the present invention. Neck collar 100 will be described as if being applied to a portion of an animal, although none is shown for clarity of illustration.

Neck collar 100 may be provided in an open state, e.g., without tensioning of the tensioning cord 118 and without engagement of fasteners 122a, 122b or fastener straps 124a, 124b. As described above, a pet collar B may be threaded through belt loops 116 such that both the pet collar B and neck collar 100 can be applied to an animal. In other embodiments, neck collar 100 may be applied directly to an animal without the use of a conventional pet collar such as pet collar B.

Neck collar 100 is applied such that an animal's neck enters opening 112 laterally through the gap between ends 115a, 115b. As described above, one or more portions of the body of neck collar 100, for example, portions proximate opposing ends 115a, 115b may be flexed or deformed such that a wider discontinuity and/or opening 112 is presented to aid in applying neck collar 100 to an animal.

With specific reference to FIG. 4A, once applied to the neck of an animal, tensioning cord 118 may be pulled so that the neck collar 100 is tightened around the neck of the animal. In this regard, the user may engage one or both ends of tensioning cord 118 and withdraw a portion thereof from the body of neck collar 100. The withdrawn portion of tensioning cord 118 may be held in place with toggles 119. The user may thereafter tuck the ends of tensioning cord 118 between the neck collar 100 and the animal's neck, for example, to minimize loose material that could be potentially caught on passing objects.

Referring additionally to FIG. 4B, a user may shorten or close the gap between ends 115a, 115b by pressing the fasteners 122a, 122b together. Closing the gap between ends 115a, 115b has the effect of further tailoring the opening 112 to the size of the neck of the animal disposed therethrough. In this regard, the cinching of tensioning cord 118 and the engagement of ends 115a, 115b of the body of neck collar 100 with fasteners 122a, 122b provides an enclosed neck collar 100 around the neck of an animal that is snugly fit to the dimensions of the animal's neck.

Turning additionally to FIG. 4C, fastener strap 124b may be extended across the gap between ends 115a, 115b to engage fastener strap 124a, providing a further securing measure of the neck collar 100 to the neck of an animal. In particular, fastener straps 124a, 124b are disengaged along a direction different from a direction along which fasteners 122a, 122b are disengaged. For example, fasteners 122a, 122b are disengaged by pulling ends 115a, 115b of the body of neck collar 100 apart, while fastener straps 124a, 124b are disengaged by peeling fastener strap 124b away from fastener strap 124a. In this regard, accidental dislodging of the neck collar 100 is avoided.

While the engagement of the tensioning cord 118, fasteners 122a, 122b, and fastener straps 124a, 124b have been described in that respective sequence, it will be understood that, in embodiments, these steps may be re-ordered without impacting the effectiveness of these features.

While this invention has been described in conjunction with the embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A neck collar comprising:
    an annular pillow case having an outer perimeter external surface, an inner perimeter external surface and an inner perimeter internal surface, the inner perimeter external surface defining a neck opening, the annular pillow case configured to wrap around the neck of an animal when positioned within the neck opening, the annular pillow case comprising distal ends forming a split in the annular pillow case, the split in the annular pillow case enabling a user to spread the distal ends apart to assist with insertion of the neck of the animal within the neck opening, the annular pillow case having an openable and closeable aperture configured to allow insertion of an annular flexible pillow body therein and to allow removal of the annular flexible pillow body therefrom, the annular flexible pillow body comprising distal ends formal a split in the annular flexible pillow body;

the annular flexible pillow body inserted within the annular pillow case;

one or more loops formed along the inner perimeter external surface of the pillow case, the one or more loops configured to receive a pet collar, the pet collar sized based on the neck of the animal;

an adjustable tensioning cord comprising stretchable material, the adjustable tensioning cord looping to form a plurality of stretchable drawstrings at least partially disposed internally to the inner perimeter internal surface of the annular pillow case and at least partially exposed externally proximate to the split in the annular pillow case, the adjustable tensioning cord capable of being adjusted to adjust a tightness of each stretchable drawstring of the plurality of stretchable drawstrings around the neck of the animal, the tightness of each stretchable drawstring of the plurality of stretchable drawstrings configured to assist in controlling a size of the neck opening, the neck opening capable of being sized based on the neck of the animal to prevent movement or shifting of the neck collar when worn by the animal, wherein the adjustable tensioning cord further comprises a toggle; and a fastening strap disposed on the outer perimeter external surface across the split in the annular pillow case and configured to fasten the distal ends from being spread apart.

2. The neck collar of claim 1, further comprising a leash attachment configured to be coupled to a portion of the neck collar and to engage a leash.

3. The neck collar of claim 2, wherein the leash attachment comprises a strap and at least one ring.

4. The neck collar of claim 1, further comprising a leash attachment strap having a first end with a first ring and a second end with a second ring, the leash attachment strap configured to surround a portion of the neck collar, at least one of the first ring and the second ring configured to engage with a hook of a leash.

5. The neck collar of claim 1, wherein the toggle is coupled to adjust an amount of the adjustable tensioning cord partially disposed internally to the inner perimeter internal surface of the annular pillow case and an amount at least partially exposed externally in order to adjust the tightness of each of the plurality of stretchable drawstrings.

6. The neck collar of claim 1, further comprising mating fasteners, each mating fastener disposed on a face of a respective one of the distal ends.

7. The neck collar of claim 1, wherein the openable and closeable aperture comprises a zipper.

8. The neck collar of claim 1, wherein the fastening strap comprises a hook-and-loop fasteners.

9. The neck collar of claim 1, wherein the one or more loops includes a plurality of belt loops formed vertically and in spaced-apart relationship around the inner perimeter external surface of the annular pillow case.

* * * * *